Aug. 16, 1932. E. A. JOLINE 1,871,528
FLEXIBLE SHAFT AND CASING ASSEMBLY
Filed Jan. 17, 1930
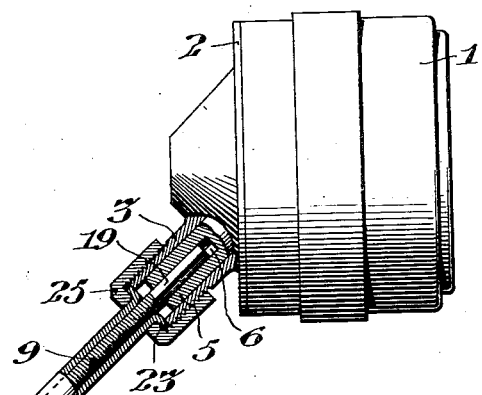
FIG. 1.
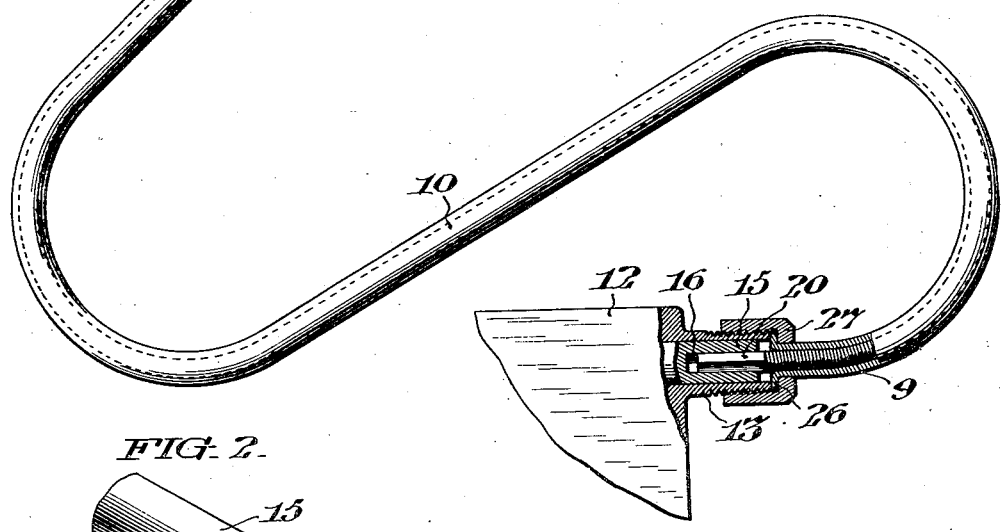
FIG. 2.
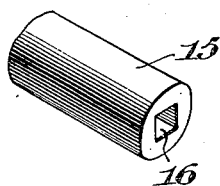
FIG. 3.
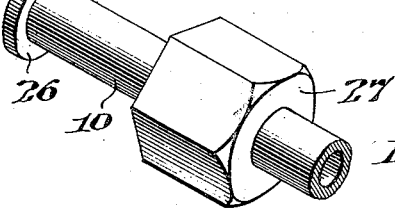
FIG. 4.
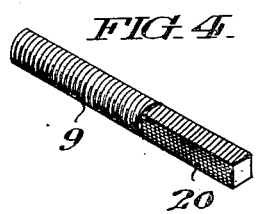
Inventor
Emmet A. Joline,
By Clifton C. Hallowell
Attorney Patented Aug. 16, 1932

1,871,528

UNITED STATES PATENT OFFICE

EMMET A. JOLINE, OF DREXEL HILL, PENNSYLVANIA, ASSIGNOR TO THE S. S. WHITE DENTAL MANUFACTURING COMPANY, A CORPORATION OF PENNSYLVANIA

FLEXIBLE SHAFT AND CASING ASSEMBLY

Application filed January 17, 1930. Serial No. 421,509.

My invention relates particularly to an assembly including means for holding a flexible shaft in such operative engagement with driving mechanism and driven mechanism as to impart motion thereby from the one to the other.

In flexible shaft assemblies as heretofore constructed, it has been the practice to provide the flexible shaft with terminal fittings soldered or swaged thereon. These fittings were of greater diametrical extent than the diametrical extent of the shaft proper, and consequently the casing or sheathing for said shaft had to be of such diameter that its bore would permit the terminal fitting to be withdrawn therethrough, and obviously there was such play of the shaft within said bore as to permit said shaft to form nodes and not only whip around therein but so bear with undue friction against the wall of said bore in spots or regions as to cause localized wear on the external strands, and consequent short life of said shaft.

The principal objects of my invention are to provide a flexible shaft and casing or sheathing assembly that may be manufactured and assembled with a minimum of expense and that may be utilized to transmit power with a maximum of efficiency.

Other objects of my invention are to provide a flexible shaft and casing or sheathing assembly in which the shaft is prevented from forming nodes, and whipping around within its casing and in which the wear on its external strands will be uniformly distributed throughout its length and its life materially prolonged.

My invention comprehends a flexible shaft having unitary connecting terminals and provided with a snugly fitting casing, by which a constant overall dimension between terminals of the shaft is maintained and through which said shaft and its connecting terminal may be readily withdrawn and replaced.

My invention further includes such a combination of driving and driven mechanism with a flexible shaft and its casing that the shaft is maintained in such axial alinement with its casing as to maintain a uniform length of shaft and a consequent uniform or synchronized transmission of power.

Specifically stated, my invention comprises driving and driven mechanism each having rotary members provided with a suitably formed socket with a cavity arranged to receive and hold the polygonal or otherwise formed (i. e. of non-circular section) terminal of a flexible shaft, and a casing for said shaft having its terminals connected with the housings of said mechanisms, said shaft casing having a bore substantially equal to the diameter of the shaft so as to snugly fit said shaft, and the polygonal (i. e. of non-circular section conforming to the socket cavity) unitary terminals formed on the shaft being of a maximum diameter equal to or less than the diameter of the shaft proper so that said shaft and its terminals may be withdrawn and replaced through said casing, since the cross section of the key lies within the extension of the external diameter of the shaft.

My invention also includes all of the various novel features of construction and arrangement as hereinafter more definitely specified.

In the accompanying drawing, Figure 1 is a sectional elevational view of a flexible shaft assembly including a speedometer and a fragment of a transmission structure connected by a flexible shaft casing inclosing a flexible shaft having its terminals swaged into square formation and fitted into suitably formed sockets in the driven shaft of the speedometer and in the driving shaft of the transmission; Fig. 2 is a perspective view of the shaft of the transmission, of which the shaft of the speedometer may be similar; Fig. 3 illustrates a fragment of the flexible shaft casing and its terminal fitting including the nut which is arranged to engage the nipple on the transmission, and is similar to the terminal and nut which engages the speedometer; and Fig. 4 is a perspective fragment of the flexible shaft and its swaged terminal which, as shown, is formed square and arranged to be inserted in a complementary socket of the transmission driving shaft.

In said figures, the speedometer 1 may supported in any suitable manner as by the plate 2 and includes the threaded nipple 3 in which the driven shaft 5 of the speedometer may rotate, said shaft 5 being provided with a suitably formed socket 6 which in the illustration has a cavity which is square in cross section.

The speedometer 1 is connected by the flexible shaft 9 and its casing 10 with the transmission 12 having the threaded nipple 13 in which the shaft 15 of the transmission mechanism rotates, said shaft 15 having the squared socket 16 which in the illustration is square in cross section, as best shown in Fig. 2.

The flexible shaft 9 is provided at one end with the unitary squared terminal 19 which may preferably be formed thereon by swaging into a solid inflexible terminal fitting and which is arranged to be entered into the socket 6 as a key therein as shown, and is provided at the other end with a similarly swaged terminal 20 entered as a key in the socket 16 of the shaft 15. The cavities in the sockets 6 and 16 are of limited length, to prevent endwise movements of the keys and shaft which might cause disengagement of the key at the opposite end; but permit a slip-joint connection of each key into the cavity of its corresponding socket.

The casing 10 may be bent into any desired form or configuration and has at one end the radially extending flange 23 arranged to be engaged by the nut 25 which is in threaded engagement with the threaded nipple 3 of the speedometer, and is provided at the other end with the radially extending flange 26 arranged to be engaged by the nut 27, which is in threaded engagement with the threaded nipple 13 of the transmission 12. Obviously, the squared terminals 19 and 20 of the shaft 9 being substantially of a maximum diameter equal to or less than the diameter of the shaft proper, the shaft casing 10 may be of such diameter that its bore snugly fits the diameter of the shaft 9 and consequently said shaft may be withdrawn with its terminals 19 and 20 through the casing and may be readily replaced therein, it being necessary in replacing a shaft only to loosen one of the nuts 25 or 27 which may be most convenient and then pull the shaft therefrom and replace it with a new one.

It may be here noted that by reason of the snug fitting casing there is no required axial relative movement of the flexible shaft terminals in the sockets of the driving and driven elements therefore, the effective flexible length of the shaft may be greater and the length of the inflexible terminals less for a given axial length of shaft unit, than a shaft unit suitable for use in a casing in which there is space for lateral play of the shaft extending therethrough.

My invention is advantageous in that by providing the shaft with a snugly fitting casing, there is no chance for the shaft to whip around therein or otherwise buckle and permit torsional lag or undue wear. Consequently, substantially the full torsional stiffness or rigidity of the shaft is utilized and the synchronous rotation of the driven and driving elements insured, whereby the transmission of torque power from the transmission mechanism is positively delivered to the driven mechanism within the speedometer casing.

Although I have shown and described the flexible shaft with its terminals swaged into square formation, it is to be understood that such form is typical and that said terminals may be of any desired contour that may be entered into a socket in the driving or driven elements for producing torque power, and have chosen to illustrate said shaft as connecting a speedometer element with a transmission element, the use of the shaft assembly is obviously adaptable to many other uses, therefore I do not desire to limit my invention to the precise details of construction and arrangement as herein set forth, as it is obvious that various modifications may be made therein without departing from the essential features of my invention as defined in the appended claims.

Having thus described my invention, I claim:

1. In a device of the class described, the combination with driving mechanism and driven mechanism each having a housing and a rotatable socket with a cavity of non-circular section, of a flexible shaft of substantially constant external diameter having end keys each of non-circular section conforming to one of said socket cavities, said keys being located in said cavities with a slip-joint connection to establish driving relationship between said sockets, a sheathing having a substantially constant internal diameter for snugly receiving the shaft whereby to avoid whipping movement of the shaft in the casing, means for securing the sheathing to said housings at its ends whereby it can guide said shaft substantially throughout its length and prevent withdrawing movement of said keys from said socket cavities, and cooperating portions on said keys and sockets for preventing axial movements of each said shaft key into its corresponding socket cavity whereby to withdraw the other said key from its corresponding socket cavity, each said key having a cross section lying within the extension of the external diameter of the shaft whereby said shaft may be withdrawn from the sheathing from either end thereof upon disengagement of the securing means at the corresponding end of the sheathing.

2. In a device of the class described, the combination with driving mechanism and driven mechanism each having a housing and a rotatable socket with a cavity of non-circular section, of a flexible shaft of substantially constant external diameter having end keys each of non-circular section conforming to one of said socket cavities, said keys being located in said cavities to establish driving relationship between said sockets, a sheathing having a substantially constant internal diameter for snugly receiving the shaft whereby to avoid whipping movement of the shaft in the casing, means for securing the sheathing to said housings at its ends whereby it can guide said shaft substantially throughout its length and prevent withdrawing movement of said keys from said socket cavities, cooperating portions on said one key and its socket for preventing axial movements of said one shaft key into its socket cavity whereby to withdraw the other said key from its corresponding socket cavity, said one key having a cross section lying within the extension of the external diameter of the shaft and making a slip-joint connection in the cavity of its socket whereby said shaft may be withdrawn from the sheathing upon disengagement of the securing means on the sheathing adjacent said one key, and means for limiting the opposite endwise movement of said shaft relative to said sheathing and the other socket.

In witness whereof, I have hereunto set my hand this sixteenth day of January, A. D., 1930.

EMMET A. JOLINE.